US007012551B2

(12) United States Patent
Shaffer

(10) Patent No.: US 7,012,551 B2
(45) Date of Patent: Mar. 14, 2006

(54) METHOD OF ANTI-BLINDING FOR ACTIVE NIGHT VISION SYSTEM

(75) Inventor: Aric David Shaffer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 10/708,037

(22) Filed: Feb. 4, 2004

(65) Prior Publication Data

US 2005/0168151 A1 Aug. 4, 2005

(51) Int. Cl.
*G08G 1/01* (2006.01)
*B60Q 1/02* (2006.01)

(52) U.S. Cl. ...................... 340/935; 340/936; 340/937; 315/82; 315/83

(58) Field of Classification Search ........ 340/935–937, 340/939, 942, 468, 469; 250/214 AL, 214 R, 250/206, 200; 315/82, 83, 77, 76, 149–159; 307/10.1, 10.8
See application file for complete search history.

(56) References Cited

U.S. PATENT DOCUMENTS

| | | | | |
|---|---|---|---|---|
| 4,891,559 | A | 1/1990 | Matsumoto et al. | 315/82 |
| 6,144,158 | A | 11/2000 | Beam | 315/82 |
| 6,379,013 | B1 | 4/2002 | Bechtel | 359/604 |
| 6,403,942 | B1 | 6/2002 | Stam | 250/214 AL |
| 6,552,342 | B1 | 4/2003 | Holz et al. | 250/330 |
| 6,774,367 | B1 * | 8/2004 | Stephan et al. | 250/330 |
| 6,828,544 | B1 * | 12/2004 | Stephan et al. | 250/214 VT |
| 2002/0181240 | A1 | 12/2002 | Holz et al. | |
| 2002/0191388 | A1 | 12/2002 | Matveev | |
| 2002/0196635 | A1 | 12/2002 | DeVolpi | |
| 2003/0001955 | A1 | 1/2003 | Holz et al. | |
| 2003/0025799 | A1 | 2/2003 | Holz et al. | |
| 2005/0094410 | A1 * | 5/2005 | Stephan et al. | 362/510 |

* cited by examiner

*Primary Examiner*—Tuyet Thi Vo
(74) *Attorney, Agent, or Firm*—Frank A. MacKenzie

(57) ABSTRACT

A night vision system for a vehicle includes a first light source for illuminating a region proximate the vehicle, the light source generating a first night vision pulse signal. The system further includes a light sensor receiving a second night vision pulse signal from an approaching vehicle, wherein the second night vision pulse blinds the first night vision pulse signal. A controller shifts pulses from the first night vision pulse signal in a different direction than pulses from the second night vision pulse signal until an anti-blinding of the first night vision pulse signal by the second night vision pulse signal is achieved.

18 Claims, 3 Drawing Sheets

METHOD OF ANTI-BLINDING FOR ACTIVE NIGHT VISION SYSTEM

BACKGROUND OF INVENTION

The present invention relates to a night vision system for detecting objects at relatively low visible light levels. In particular, the invention concerns an active night vision system having an anti-blinding scheme employing pulsed illumination and synchronization with detected pulsed light sources from approaching vehicles.

Night vision systems are utilized to allow a user to see objects at relatively low visibility light levels. Night vision systems are typically classified as either passive night vision systems or active night vision systems. In known passive night vision systems used in automotive applications, mid-infrared cameras are used to image objects using the ambient infrared light emitted by the objects in the environment.

Known active night vision systems utilize a near-infrared (NIR) laser diode or a filtered incandescent light source to generate NIR light. The NIR light is subsequently reflected off objects in the environment and is received by a NIR-sensitive camera. The camera generates a video signal responsive to received light.

A problem encountered by night vision systems is blinding, wherein two vehicle including night vision systems approach each other.

One solution to night vision system blinding by oncoming vehicles similarly equipped with a NIR light source is provided in U.S. patent application Ser. No. 09/683,840 entitled "GPS-Based Anti-Blinding System For Active Night Vision." In that application, GPS is used to determine the direction of travel of the vehicles as well as an absolute time reference. Vehicles proximate one another synchronize their pulsed light sources to the absolute time reference signal with the phase of the light pulse based on the direction of motion of the respective vehicles. In this way, two cars approaching one another from opposite directions will have their NIR light sources pulsed out-of-phase with each other at duty cycles below 50% to avoid having their light source "on" when the opposing vehicle's camera is also "on." The disclosed anti-blinding scheme, however, requires that all night vision equipped vehicles must also be equipped with GPS systems.

Thus, there exists a need for alternate night vision systems and methods related thereto that mitigate or eliminate blinding of the vehicle's night vision system by similarly equipped approaching vehicles.

SUMMARY OF INVENTION

The present invention provides an active night vision system and method related thereto, which mitigates the blinding effects of nearby similarly equipped vehicles.

The night vision system for a vehicle includes a first light source for illuminating a region proximate the vehicle, the light source generating a first night vision pulse signal. The system further includes a light sensor receiving a second night vision pulse signal from an approaching vehicle, wherein the second night vision pulse blinds the first night vision pulse signal. A controller shifts pulses from the first night vision pulse signal in a different direction than pulses from the second night vision pulse signal until an anti-blinding of the first night vision pulse signal by the second night vision pulse signal is achieved.

In another embodiment, an anti-blinding method for a vehicle includes generating a first light pulse train from the vehicle; detecting a second light pulse train from a second approaching vehicle blinding the first light pulse train from the vehicle; and shifting the first light pulse train to the right by increments until anti-blinding is achieved. The direction of right or left is not relevant as long as it is consistent with all vehicles employing the scheme.

Other advantages and features of the invention will become apparent to one of skill in the art viewing the following detailed description, which includes reference to the drawings, illustrating features of the invention by way of example.

BRIEF DESCRIPTION OF DRAWINGS

For a more complete understanding of this invention, reference should now be made to the embodiments illustrated in detail in the accompanying drawings and described below by way of examples of the invention.

In the drawings.

DETAILED DESCRIPTION

Figure 1:
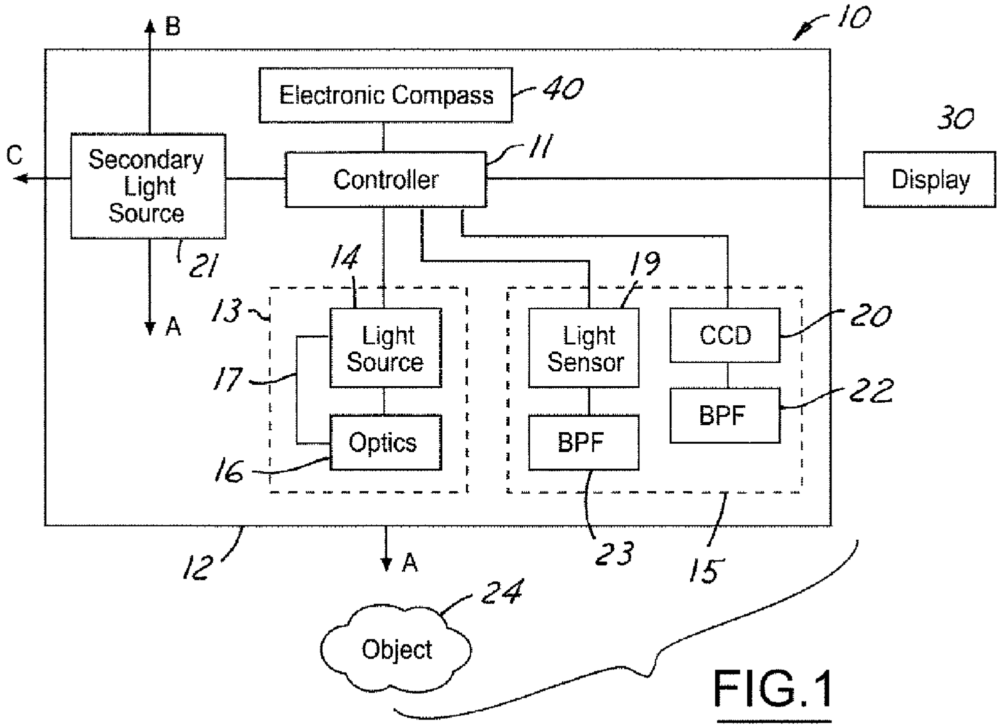
FIG. 1 is a schematic block diagram of a night vision system in accordance with one embodiment of the present invention.

Referring now to the drawings wherein like reference numerals are used to identify identical components in the various views, FIG. 1 illustrates a night vision system 10 for detecting objects at relatively low visibility light levels. The system 10 may be utilized in a plurality of applications. For example, the system 10 may be used in an automotive vehicle to allow a driver to see objects at night that would not otherwise visible to the naked eye. As illustrated, the system 10 includes a housing 12 including a controller 11, an illumination subsystem 13, a receiver 15 and, a secondary light source 21.

Several of the system components may be included within a housing 12. It should be understood, however, that the components of system 10 contained within housing 12 could be disposed at different locations within the vehicle wherein the housing 12 may not be needed. For example, the components of the system 10 could be disposed at different operative locations in the automotive vehicle such that a single housing 12 would be unnecessary.

As will be discussed in more detail below, the system 10 may be used to detect any reflective object, such as object 24, in operative proximity to the system 10.

The controller 11 is preferably a microprocessor-based controller including drive electronics for the illumination subsystem 13, receiver 15, and image processing logic for the display system 30. Controller 11 also includes drive electronics for the secondary light source 21. Alternatively, display unit 30 may include its own respective control logic for generating and rendering image data.

The illumination subsystem 13 includes a NIR light source 14, beam-forming optics 16, and a coupler 17 between the two. Many light source and optics arrangements are contemplated by the present invention. For example, the light source 14 may be a NIR diode laser, the beam forming optics 16 may comprise a thin-sheet optical element followed by a holographic diffuser, whose combined purpose is to form a beam pattern in the direction of arrow A comparable to the high-beam pattern used for normal vehicle headlamps; and the coupler 17 between the light source 14 and optics 16 can be a fiber-optic cable.

The illumination subsystem 13 illuminates the driving environment without blinding drivers in approaching vehicles, since the NIR light is not visible to the human eye. The light source 14 may comprise a NIR diode laser or light-emitting diode, or any other NIR source that can be switched on and off at frequencies at or exceeding typical video frame rates (30–60 Hz). For example, the light source 14 may include a single stripe diode laser, model number S-81-3000-C-200-H manufactured by Coherent, Inc. of Santa Clara, Calif. Further, the coupler may be a fiber-optic cable, or the light source could be directly coupled to the optical element 16 through a rigid connector, in which case the coupler would be a simple lens or reflective component. The coupler 17, depending upon the spread characteristics of the light source 14 may be omitted altogether.

Although the system 10 preferably uses a NIR laser light source, an alternate embodiment of system 10 may utilize a conventional light emitting diode NIR source, or any other type of NIR light source, as long as it is capable of pulsed operation, in lieu of the infrared diode laser.

The secondary light source 21 is used as a trigger pulse light source. Secondary light source 21 can include any type of pulsed light source but preferably is an infrared light source operating at a different wavelength than primary light source 14. The secondary light source 21 can be used to synchronize the gating of the primary light source and receiver 15 to eliminate the blinding effects which are possible when two similarly equipped vehicles approach one another from opposite directions.

The secondary light source 21 is also configured to emit light in the same direction as the illumination subsystem 13, which is indicated by direction arrow A corresponding to the forward direction of travel of the vehicle. The secondary light source can also be configured to transmit light in the direction of indicator arrow B corresponding to the direction rearward of the vehicle. The rearwardly directed trigger pulse is used to synchronize the night vision illumination systems of commonly-equipped vehicles traveling in the same direction as described in further detail below.

If the same light source cannot be physically configured to emit light at the second wavelength in both direction A and direction B, two separate light sources may be necessary and are contemplated by the present invention. For embodiments including a third wavelength requirement, in direction C, a third light source may further be required. In such cases, the additional light sources would be tertiary light sources similar to the secondary light source.

To distinguish light emitted by the secondary light source 21 in direction A, from light emitted in direction B, the secondary light source is capable of transmitting pulses of different duration. Of course, characteristics other than, or in addition, to, pulse width can distinguish a forward trigger pulse ($T_F$) from a rearward trigger pulse ($T_R$). For example, the wavelength of light may differ.

More than one rearward trigger pulse ($T_{R1}$, $T_{R2}$) may be necessary to convey synchronization information to vehicles following a reference vehicle. Thus, the secondary (or tertiary) light source includes the capability to further distinguish the normal rearward trigger pulse ($T_{R1}$) from synchronized rearward trigger pulse ($T_{R2}$). Again, this characteristic may be a different pulse width and/or wavelength of light (third wavelength of light). Another distinguishing characteristic may include a double pulse.

The receiver 15 includes a NIR-sensitive camera 20 and optical band pass filter 22. The NIR-sensitive camera 20 provides a video signal responsive to reflected infrared light received by the camera 20. The camera 20 may comprise a CCD camera or a CMOS camera. In one embodiment of the system 10, the CCD camera is camera model number STC-H720 manufactured by Sentech Sensor Technologies America, Inc. Infrared light emitted from the illumination subsystem 13 and reflected off the object 24 in the environment is received by the NIR-sensitive camera 20. The video signal is transmitted to the controller 11 or directly to the display module 30 where it is processed and displayed to allow the vehicle operator to see the object 24. The display 30 may be a television monitor, a CRT, LCD, or the like, or a heads-up-display positioned within the automotive vehicle to allow the user to see objects illuminated by the system 10.

The optical band pass filter 22 is provided to filter the infrared light reflected from the object 24. In particular, the filter 22 only allows light within the NIR light spectrum to be received by the camera 20. Preferably, the filter 22 allows a maximum transmission of light at a wavelength equal to the wavelength of light generated by the NIR light source 14. An advantage of using the filter 22 is that the filter 22 prevents saturation of the pixel elements (i.e., blooming) in the camera 20 by visible light emitted from the headlamps of other automotive vehicles. The filter 22 is preferably disposed proximate to a receiving lens in the camera 20.

The light sensor 19 includes a photodiode or photocell or similar light sensor mounted in the receiver module 15 and filtered, such as by band pass filter 23, to be sensitive only to light at the wavelength corresponding to the secondary light source 21. Alternatively, the average output signal of the camera 20, spatially integrated over some or all of its field-of-view, could serve as the light sensor 19. Thus, the light sensor 19 detects only trigger pulses rather than the primary light source.

Figure 2:
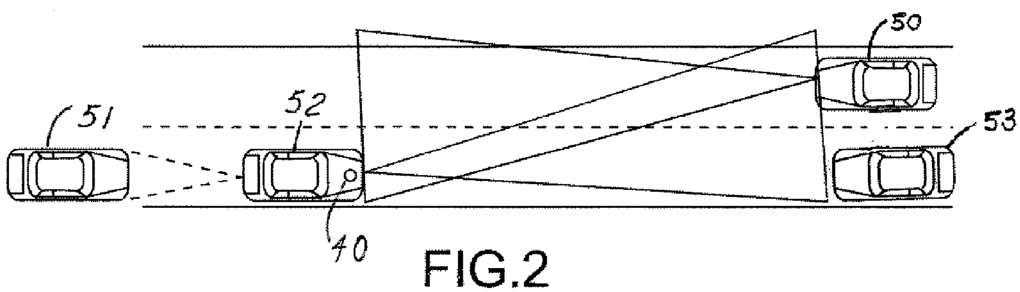
FIG. 2 is a schematic diagram of a vehicle-operating environment in which the present invention may be used to advantage.

Referring now to FIG. 2 there is shown a vehicle-operating environment wherein the present invention may be used to advantage. In FIG. 2, two vehicles 50, 52 are shown approaching one another from opposite directions. Both vehicles 50, 52 are similarly equipped with a night vision system 10 in accordance with the present invention. Vehicle 51, which is following vehicle 52, is also similarly equipped with a night vision system in accordance with the present invention. In such a case, vehicle 52 includes the secondary light source 21 (or tertiary light source) emitting in the rearward direction B such that vehicle 51 can synchronize the pulse timing of its primary light source with that of vehicle 52 so that both vehicles will operate their night vision system in sync with each other, but out-of-phase with approaching vehicle 50. If the illumination sources of vehicles 50 and 52 were simultaneously on, the respective receivers of both vehicles 50, 52 would be saturated or "blinded" by the opposing vehicle's illumination device.

The present invention includes at least two embodiments for accomplishing this. The first is a method including the two vehicles 50, 52 traveling in opposite directions wherein the controller 11 receives opposing IR light signals and shifts the pulse phase to the right (or left). The second is a method including the vehicle 52 having a compass 40 detecting and shifting a pulse pattern out of phase with the pulse pattern of the other vehicle 50 or 51.

Figure 3:
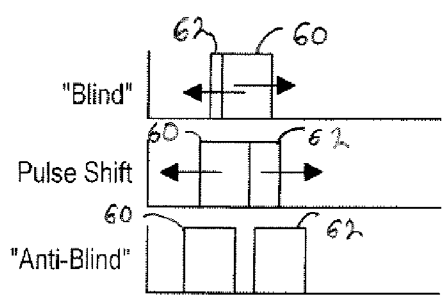
FIG. 3 is a graph illustrating the timing of the night vision signals for the vehicles of FIG. 2 in accordance with one embodiment of the present invention.

Referring now to FIG. 3, there is shown an anti-blinding scheme illustrating the night vision signals for the vehicles 50, 52 of FIG. 2 in accordance with a first embodiment of the present invention.

Illustrated are pulse phases 60 and 62 from the vehicle 52 and the vehicle 50. For the present embodiment, all vehicles are equipped with NV systems.

The controller 11 of the vehicle 52 receives detected opposing IR light and shifts the pulse phase of that opposing light to the right. Resultantly, the pulse phase shifts in small increments until blinding is prevented. A controller within vehicle 50 may also shift opposing signals, thereby accelerating the process. Alternately, if the vehicle 51 is following the vehicle 52, and both are equipped with NV, the system modifies the pulse pattern in real-time, as was discussed above.

Figure 4A:
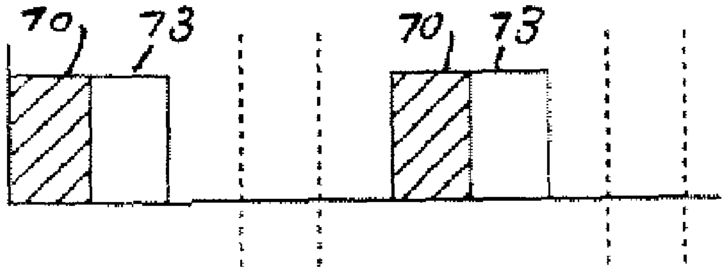
FIG. 4*a* is a graph illustrating the timing of the night vision signals for the vehicles of FIG. 2 in accordance with another embodiment of the present invention.
Figure 4B:
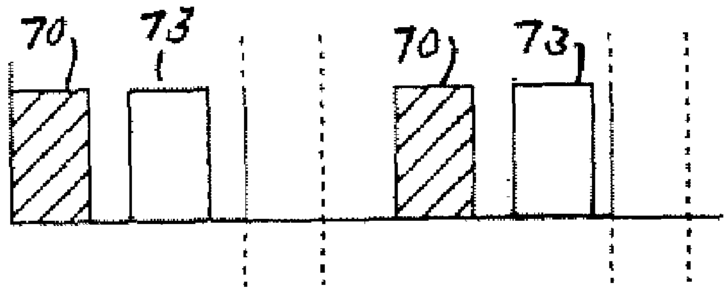
FIG. 4*b* is a graph illustrating a shifted night vision signal in accordance with FIG. 4*a;*
Figure 4C:
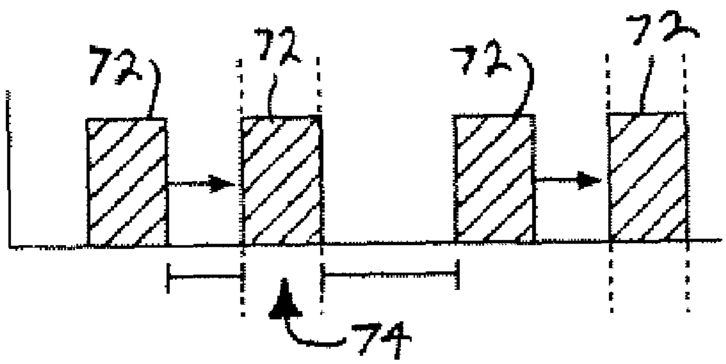
FIG. 4*c* is a graph illustrating a shifted night vision signal in accordance with FIG. 4*a;*

Referring now to FIGS. 4*a*, 4*b*, and 4*c*, there is shown an anti-blinding scheme illustrating the night vision signals for the vehicles 50, 52 of FIG. 2 in accordance with a second embodiment of the present invention.

Illustrated in FIG. 4(*a*) are dominant pulse phases 70 from vehicle 50 and dominant pulse phases 73 from vehicle 53 traveling alongside vehicle 50. Illustrated in FIG. 4(*b*) are shifted pulse phases 70 and 73. Illustrated in FIG. 4(*c*) are pulse phases 72 from adaptive vehicle 52 shifted into an optimized position to avoid blinding. For illustration, all vehicles are equipped with NV systems, and the vehicle 52 further includes an electronic compass 40.

The compass 40 is broken into zones, e.g. N (315–45 deg), E (45–135 deg), S (135–225 deg), and W (225–315 deg). This generates four zones where half are deemed dominant, their pulse pattern will be the signal that the other adaptive zones will use to modify their pulse pattern to avoid blinding or pulse overlap.

For a dominant vehicle pulse pattern (Traveling N or E), an opposing vehicle will trigger the anti-blinding scheme, typically at around 60 Hz and 25–30% Duty Cycle having a gap 74 between pulses thereof.

If two dominant vehicles 50, 53 are approaching side by side in a two lane configuration, the opposing system will adapt to fill in the empty space 74 between pulses 72 in the most optimized position to avoid blinding.

In essence, if the vehicle 50 equipped with NV is traveling in one of the dominant zones (for example North (between 315–45 deg) or East (45–135 deg)), the timing will be generated that the other vehicle 52 traveling in the opposite direction synchronize to and shift its camera and laser pulse pattern out of phase.

The adaptive vehicle 52 will use the photo sensor 19 tuned for the NV wavelength to set or reset the pulse timing out of phase with the dominant. This is accomplished by offsetting the pattern by a certain amount of milliseconds to place the pattern in an optimized location (this may be the center of the space gap 74). This is the most optimized position with equal space on each side to avoid overlap and blinding due to any small timing differences in electronic oscillators.

The controller 11 of the vehicle 52 receives detected opposing IR light and shifts the pulse phase of that opposing light to the right. Resultantly, the pulse phase shifts in small increments until blinding is prevented. For this method, only one vehicle 52 is necessary to detect and shift its pulse pattern 70 out of phase with the other pulse pattern 72.

Figure 5:
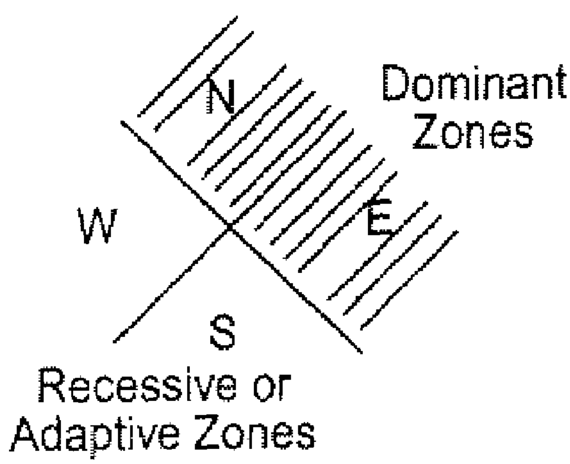
FIG. 5 is a diagram of dominant and recessive zones in accordance with another embodiment of the present invention.

This method includes zone system allocation for the compass 40, illustrated in FIG. 5. One embodiment includes using two or more zones, wherein half of the zones are dominant (non-adaptive) and the other half are recessive (adaptive. This allows the adaptive vehicle 52 to modify or synchronize its pulse pattern to the timing signal of the dominant opposing vehicle 50 or 51.

In another embodiment, the front trigger laser of each vehicle can be eliminated such that only the rearwardly directed trigger laser is used to synchronize the respective vehicle's night vision system light source.

Figure 6:
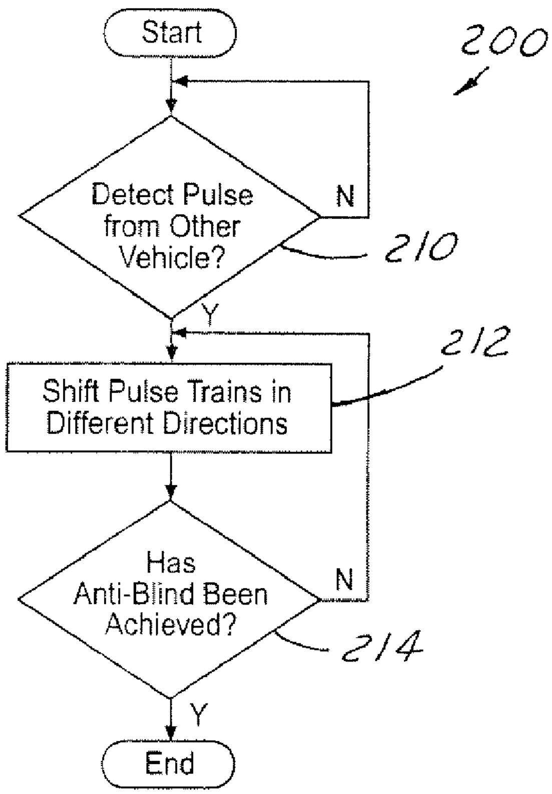
FIG. 6 is a logic flow diagram of one method of operating the night vision system in accordance with another embodiment of present invention.

Referring now to FIG. 6, there is shown a logic flow diagram 200 of a method of operating a night vision system in accordance with the anti-blinding scheme of FIG. 3. The logic begins in inquiry block 210 where a check is made whether an infrared or night vision pulse is detected from a vehicle other than the vehicle 52. For a negative response, inquiry block 210 reactivates.

Otherwise, in operation block 212, pulse trains are shifted by either the controller 11 solely or alternately by the controller 11 and a controller on the approaching vehicle 50, 51.

In inquiry block 214, a check is made whether anti-blinding has been achieved. For a negative response, operation block 212 reactivates.

Figure 7:
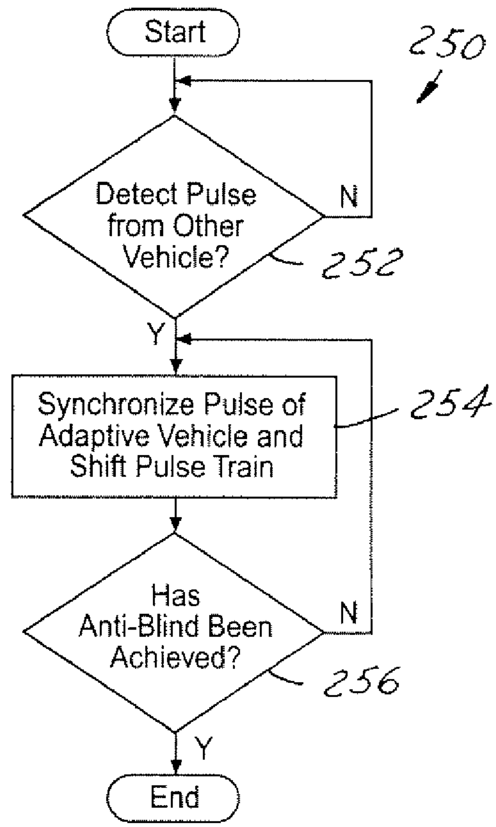
FIG. 7 is a logic flow diagram of another method of operating the night vision system in accordance with another embodiment of the present invention.

Referring now to FIG. 7, there is shown a logic flow diagram 250 of another method of operating an active night vision system, in accordance with the present invention, corresponding to the anti-blinding scheme of FIGS. 4*a*, 4*b*, and 4*c*. In inquiry block 252, the logic is the same as that described with respect to FIG. 6 for block 210 regarding the detection of an oncoming vehicle trigger pulse and the transmission of an alternate rearward trigger in the presence of a detected night vision pulse.

In operation block 254, however, the controller 11 synchronizes the pulse of the adaptive vehicle and shifts the pattern out of phase.

In inquiry block 256, a check is made whether anti-blinding has been achieved. For a negative response, operation block 254 reactivates.

In operation, an anti-blinding method for a vehicle includes generating a first light pulse train from the vehicle; detecting a second light pulse train from a second approaching vehicle blinding the first light pulse train from the vehicle; and shifting the first light pulse train to the right by increments until anti-blinding is achieved.

From the foregoing, it can be seen that there has been brought to the art a new and improved vehicle active night vision system which has advantages over prior vehicle night vision systems. While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A night vision system for a vehicle comprising:

a first light source for illuminating a region proximate the vehicle, said light source generating a first night vision pulse signal;

a light sensor receiving a second night vision pulse signal from an approaching vehicle, wherein said second night vision pulse blinds said first night vision pulse signal; an electronic compass comprising zones comprising dominant zones and recessive zones, an electronic compass comprising zones comprising dominant zones and recessive zones; and a controller shifting pulses from said first night vision pulse signal in a different direction than pulses from said second night vision pulse signal until an anti-blinding of said first night vision pulse signal by said second night vision pulse signal is achieved, wherein said controller synchronizes said first night vision pulse signal with a timing signal of said second night vision pulse signal during said anti-blinding.

2. The system according to claim 1, wherein said approaching vehicle comprises a second controller shifting said second night vision pulse signal in a different direction as said first night vision pulse signal until anti-blinding is achieved.

3. The system according to claim 1, wherein half of said zones are dominant zones and half of said zones are recessive zones.

4. The system according to claim 1, wherein said controller only shifts said first night vision pulse signal until said anti-blinding is achieved.

5. The system of claim 1, wherein said second night vision pulse signal comprises an infrared signal and wherein said sensor comprises a photodiode filtered for a wavelength of said infrared signal.

6. The system of claim 1, wherein said first light source is disposed pointing in a direction of travel of the vehicle or pointing behind the vehicle.

7. The system according to claim 1, wherein said controller is programmed to pulse said first light source at a duty cycle of 50% or less.

8. The system according to claim 1, further comprising:

a second light source illuminating region forward of the vehicle;

a third light source illuminating a region rearward of the vehicle;

wherein said first light source operates at a first wavelength, said second light source operates at a second wavelength, and said third light source operates at a third wavelength, said controller compensating for blinding of said second light source and said third light source.

9. An anti-blinding method for a vehicle comprising:

generating a first light pulse train from the vehicle;

detecting a second light pulse train from a second approaching vehicle blinding said first light pulse train from the vehicle;

determining dominant zones and recessive zones on an electric compass, whereby said dominant zones include said second light pulse train and said recessive zones include said first light pulse train; and shifting said first light pulse train by increments until anti-blinding is achieved through offsetting said first light pulse train from said second light pulse train.

10. The method according to claim 9, further comprising synchronizing a timing signal of said first light pulse train with a timing signal of said second light pulse train as a function said dominant zones and said recessive zones.

11. The method according to claim 9, further comprising: shifting said second light pulse train until anti-blinding is achieved.

12. The method according to claim 9, wherein detecting further comprises detecting said second light pulse train from a rear facing or a front facing sensor coupled to the vehicle.

13. The method according to claim 9, further comprising optimizing a space placement between successive pulses of said second light pulse train for offsetting said first light pulse train therewith.

14. The method according to claim 9, further comprising: generating a night vision display of the second vehicle as a function of said first light pulse train signal.

15. An anti-blinding method for a first vehicle approached by a second vehicle comprising:

generating a first light pulse train from the vehicle;

detecting a second light pulse train from the second vehicle blinding said first light pulse train from the vehicle;

determining dominant zones and recessive zones on an electric compass, whereby said dominant zones include said second light pulse train and said recessive zones include said first light pulse train;

synchronizing a timing signal of said first light pulse train with a timing signal of said second light pulse train as a function said dominant zones and said recessive zones; and shifting said first light pulse train by increments until anti-blinding is achieved.

16. The method according to claim 15, further comprising: illuminating a region proximate the vehicle with said first light pulse train comprising a first light source operating at a first wavelength;

pulse illuminating a region forward of the vehicle, said forward pulse being at a second wavelength;

pulse illuminating a region rearward of the vehicle, said rearward pulse being different than said forward pulse in either wavelength or duration.

17. The method according to claim 15, further comprising: compensating for blinding from night vision signals received in both a rearward facing sensor and a forward facing sensor.

18. The method according to claim 15, further comprising: generating a night vision display of the second vehicle as a function of said first light pulse train signal.

* * * * *